(12) United States Patent
Veraa et al.

(10) Patent No.: US 11,586,798 B1
(45) Date of Patent: Feb. 21, 2023

(54) AVOIDING ELECTROSTATIC DISCHARGE EVENTS FROM CROSS-HIERARCHY TIE NETS

(71) Applicant: International Business Machines Corporation, Armonk, NY (US)

(72) Inventors: Brian Veraa, Round Rock, TX (US); David Wolpert, Poughkeepsie, NY (US); Ryan Michael Kruse, Williamson, TX (US); Christopher Gonzalez, Shelburne, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/401,379

(22) Filed: Aug. 13, 2021

(51) Int. Cl.
| | |
|---|---|
| *G06F 30/398* | (2020.01) |
| *G06F 30/392* | (2020.01) |
| *G06F 30/343* | (2020.01) |
| *G06F 30/347* | (2020.01) |
| *G06F 117/10* | (2020.01) |
| *G06F 119/06* | (2020.01) |

(52) U.S. Cl.
CPC .......... *G06F 30/398* (2020.01); *G06F 30/343* (2020.01); *G06F 30/347* (2020.01); *G06F 30/392* (2020.01); *G06F 2117/10* (2020.01); *G06F 2119/06* (2020.01)

(58) Field of Classification Search
CPC .............................. G06F 30/398; G06F 30/392
USPC ....................................................... 716/100
See application file for complete search history.

(56) References Cited

U.S. PATENT DOCUMENTS

| | | | |
|---|---|---|---|
| 6,526,548 B1 | 2/2003 | Voldman | |
| 6,704,179 B2 | 3/2004 | Voldman | |
| 6,898,546 B2 | 5/2005 | Neunhoeffer et al. | |
| 7,394,631 B2 | 7/2008 | Watanabe et al. | |
| 7,885,047 B2 | 2/2011 | Deval et al. | |
| 8,018,698 B2 | 9/2011 | Huang | |
| 8,456,783 B2 | 6/2013 | Besse et al. | |
| 8,681,460 B2 | 3/2014 | Kitabata et al. | |
| 8,881,085 B1 * | 11/2014 | Karp | H01L 23/60 |
| | | | 716/112 |
| 9,462,674 B1 * | 10/2016 | Fakhruddin | G06F 30/367 |
| 10,997,332 B1 * | 5/2021 | Kukal | G06F 30/392 |

(Continued)

*Primary Examiner* — Suchin Parihar
(74) *Attorney, Agent, or Firm* — Cantor Colburn LLP; Kelsey M. Skodje

(57) ABSTRACT

A system is configured to avoid establishing an electrostatic discharge (ESD) region in an integrated circuit (IC). The system includes a processor and memory storing an IC simulator. The IC simulator establishes an IC chip that is sub-divided into a plurality of hierarchical levels. The IC simulator further analyzes a first hierarchical level to determine first connectivity information indicating connectivity between the first hierarchical level and one or both of lower-level pins and lower-level nets of a targeted hierarchical level having a lower-level of hierarchy with respect to the first hierarchical level and analyzes the targeted hierarchical level to determine second connectivity information indicating diode connectivity to one or both high-level pins and higher-level nets included in the first hierarchical level. The IC simulator determines an ESD fail region mitigation operation configured to avoid establishing the ESD region based on the first connectivity information and the second connectivity information.

18 Claims, 8 Drawing Sheets

(56) References Cited

U.S. PATENT DOCUMENTS

2005/0102644 A1\* 5/2005 Collins ................ G06F 30/367
716/112
2011/0016440 A1\* 1/2011 Bergmann ............ G06F 30/367
716/106

\* cited by examiner

AVOIDING ELECTROSTATIC DISCHARGE EVENTS FROM CROSS-HIERARCHY TIE NETS

BACKGROUND

The present invention generally relates to integrated circuit development, and more specifically, to integrated circuit design that avoids electrostatic discharge (ESD) events caused by cross-hierarchy tie nets.

The development of an integrated circuit (i.e., chip) involves several stages from design through fabrication. The chip may be subdivided into several levels of hierarchy (often referred to as "hierarchical levels") to simplify design and testing tasks at different stages. The levels of hierarchy can include, but are not limited to, a chip level, followed by a lower-level core level, followed by a further lower-level unit level, which is followed by a yet further lower-level random logic macro (RLM) level. Generally, a cell or macro may be regarded as a sub-section of the chip. For example, each macro may comprise a number of cells. Once the design is finalized, tests may be completed to ensure that design rules established by a foundry are met prior to fabrication.

SUMMARY

Embodiments of the present invention are directed to avoiding an electrostatic discharge (ESD) region in an integrated circuit (IC). According to a non-limiting embodiment, a system is configured to avoid establishing an electrostatic discharge (ESD) region in an integrated circuit (IC). The system includes a processor and memory storing an IC simulator. The processor is configured to control the IC simulator to perform operations that include establishing an IC chip that is sub-divided into a plurality of hierarchical levels. The processor further controls the IC simulator to analyze a given hierarchical level among the plurality of hierarchical levels to determine connectivity information between the given hierarchical level and pins and/or nets contained in a lower-level of hierarchy with respect to the given hierarchical level. According to a non-limiting embodiment, this lower-level of hierarchy may be one or more levels removed from the given hierarchical level). Using this information. The IC simulator analyzes the given hierarchical level to determine diode connectivity to pins and/or nets in the given hierarchical level. The IC simulator determines an ESD fail region mitigation operation configured to avoid establishing the ESD region based on the analyzed connectivity information.

According to another non-limiting embodiment, a computer implemented method is provided to avoid establishing an electrostatic discharge (ESD) region in an integrated circuit (IC). The method comprises establishing, via an IC simulator, an IC chip that is sub-divided into a plurality of hierarchical levels, and analyzing, via the IC simulator, a given hierarchical level among the plurality of hierarchical levels to determine connectivity information between the given hierarchical level and pins and/or nets contained in a lower-level of hierarchy with respect to the given hierarchical level. According to a non-limiting embodiment, this lower-level of hierarchy may be one or more levels removed from the given hierarchical level). Using this information, the IC simulator analyzes the given hierarchical level to determine diode connectivity to pins and/or nets in the given hierarchical level, and determining, via the IC simulator, an ESD fail region mitigation operation configured to avoid establishing the ESD region based on the analyzed connectivity information.

According to another non-limiting embodiment, a computer program product comprises a computer readable storage medium having program instructions embodied therewith. The program instructions are executable by a processor to cause the processor to control an integrated circuit (IC) simulator to perform operations comprising establish an IC chip that is sub-divided into a plurality of hierarchical levels, and analyze a given hierarchical level among the plurality of hierarchical levels to determine connectivity information between the given hierarchical level and pins and/or nets contained in a lower-level of hierarchy with respect to the given hierarchical level. According to a non-limiting embodiment, this lower-level of hierarchy may be one or more levels removed from the given hierarchical level). The operations further comprise analyzing the given hierarchical level to determine diode connectivity to pins and/or nets in the first hierarchical level, and determine an ESD fail region mitigation operation configured to avoid establishing the ESD region based on the analyzed connectivity information.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
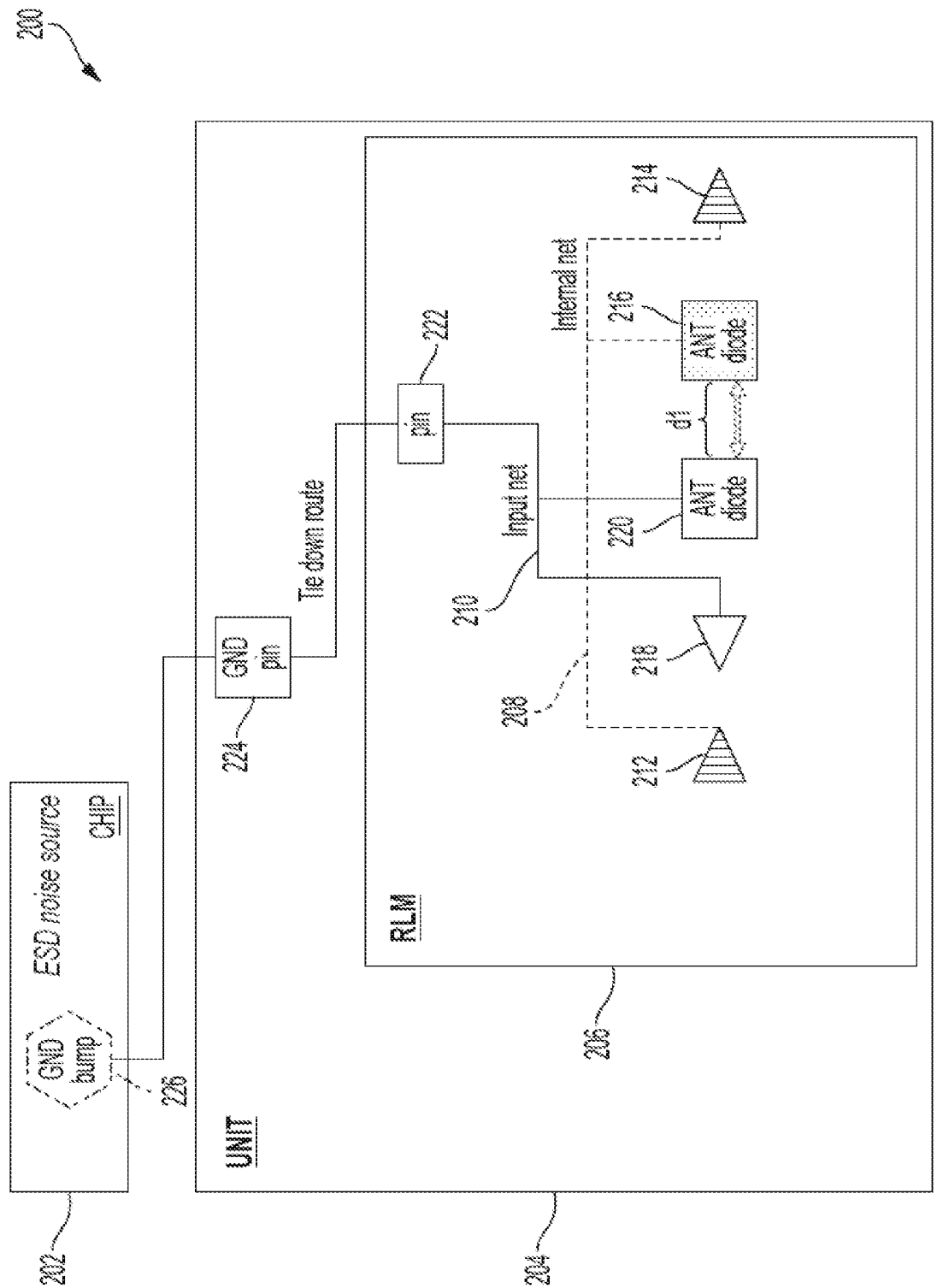
FIG. 1 illustrates a schematic diagram of a macro hierarchy containing a chip package connection, a unit block, and a child macro targeted for a correct-by-construction operation to avoid ESD event caused by cross-hierarchy tie nets according to a non-limiting embodiment of the invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Integrated circuits are typically designed to have a high tolerance for electrostatic discharge (ESD) and other transient current conditions which may occur on connections of an integrated circuit. ESD tolerance is implemented to reduce the probability of damage due to high current conditions, such as those experienced during an ESD event or electrical overstress (EOS) when the current into a circuit device may approach multiple amperes, rather than the usual operating milliampere level.

A similar high current condition can also be experienced in the driver circuits for the integrated circuit due, for example, to abnormally high current conditions on an input/output (I/O). It is, therefore, desirable to evaluate a circuit design for high current conditions, prior to implementing in silicon, and even prior to preparing the photo masks for creating the circuit in silicon.

During the design of macros, diodes (sometimes referred to as antenna diodes) are often manually added to the layout of the macro to provide a contact from a metal layer to a diffusion layer of a device for manufacturing purposes. This contact provides a path for charge generated in long metal lines during manufacturing to be dissipated without damaging a transistor gate or other circuit implemented on a semiconductor substrate.

In addition, some designs may call for "tying off" or "tying down" one or more nets included in the macro. For example, a net may be "tied off" or "tied down" when it is connected to a gate or element (e.g., an antenna diode) that is directly connected to a constant signal such as a supply rail (e.g., power or ground), rather than being connected to something that will switch like another logic gate. Gates may be tied to a power rail for a variety of reasons, such as not needing to use a portion of a circuit in some situations. In such a situation, leaving an input floating could be undesirable for downstream circuit functionality (e.g., could cause inefficient power consumption). To resolve this issue, the input is tied to a specific voltage, which is commonly a power or ground rail depending on the polarity requirement of the unused input. The unused input can have a polarity requirement because even though a signal/gate may be unused, it may be one of multiple inputs to a subsequent gate, and that subsequent gate's function may require a specific polarity of the unused input.

To avoid ESD failure conditions, such as large voltage potentials between local diffusion contacts, placements of antenna diodes typically follow an ESD distance rule. The ESD distance rule can be described generally as diodes having different polarities or diodes connected to different nets with different polarities are spaced apart from one another according to an ESD distance threshold (ESDth).

Turning to FIG. 1, for example, a simulated IC environment 200 is illustrated accordingly to a non-limiting embodiment. The simulated IC environment 200 includes a first level of hierarchy 202, a second level of hierarchy 204, and a third level of hierarchy 206. Although the first level 202 of hierarchy is illustrated as a "chip level" or simply a "chip", the second level of hierarchy 204 is illustrated as a "unit level", or simply a "unit" and the third level of hierarchy 206 is illustrated as an "RLM level" or simply an "RLM", it should be appreciated the different types of hierarchies and/or a different number of hierarchies can be employed in the simulated IC environment 200 without departing from the scope of the invention.

In this example, the RLM 206 is shown contained in the unit 204. In terms of hierarchy levels, the RLM 206 would be a "child" of the unit 204 and a grandchild of the chip 202. The RLM 206 includes a first net 208 (e.g., an internal net) and a second net 210 (e.g., an input net). The internal net 208 has a first polarity and is contained in the RLM 206. The input net 210 has a second polarity different from the first polarity (e.g., an opposite polarity with respect to the internal net 208 and has one or more connections located externally from the RLM. One or more internal components are connected to the internal net 208. In this example, the internal components include a first internal gate 212, a second internal gate 214, and an internal antenna diode 216, each which have the first polarity associated with the internal net 208. It should be appreciated that the types of internal components and number of internal components are not limited to that shown in FIG. 1.

The input net 210 includes one or more input components connected thereto. In this example, the input components include a first input gate 218, an input antenna diode 220, an RLM pin 222, a unit ground pin 224, and a chip connection 226. The input components including the input antenna diode 220 have the second polarity associated with the input net. It should be appreciated that the types of internal components and number of internal components are not limited to that shown in FIG. 1.

The RLM pin 222 can have a first node that is connected to a portion of the input net 210 located internally with respect to the RLM 206, while having a second node that is connected to the unit ground pin 224 located in the unit 204 external from the RLM 206, i.e., in a higher level of hierarchy with respect to the RLM 206. Similarly, the unit ground pin 224 can have a node that is connected to a chip ground bump 226 located at the chip 202 that is external from both the unit 204 and the RLM 206, i.e., in a higher level of hierarchy with respect to both the unit 204 and the RLM 206.

Figure 2:
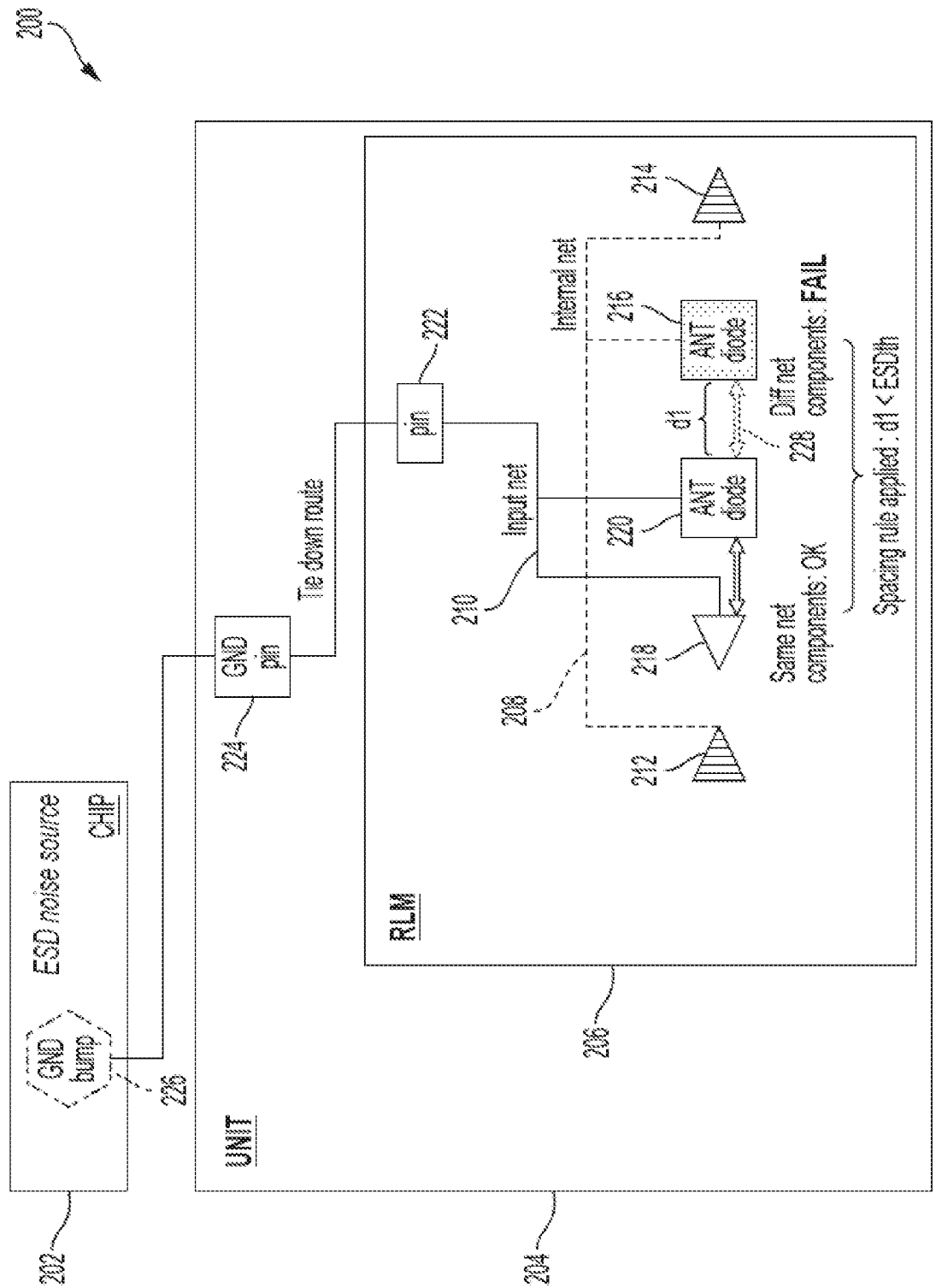
FIG. 2 illustrates the child macro illustrated in FIG. 1 with an identified ESD fail region according to a non-limiting embodiment of the invention.

As mentioned above, the input antenna diode 220 is spaced apart from the internal antenna diode 216 by a first distance (d1). The chip ground bump 226, however, can inadvertently operate as an ESD noise source. Due its connection to the input net 224, the ESD noise source provided by the chip ground bump 226 is effectively delivered directly to the input antenna diode 220. As shown in FIG. 2, when the first spacing (d1) violates the ESD distance rule (e.g., d1 is less than the ESD distance threshold) an ESD fail region 228 can be created that is buried below several layers of hierarchy, e.g., in the RLM 206. In this scenario, the ESD fail region 228 is established between the input antenna diode 220 and the internal antenna diode 216 due to their opposing polarities, along with the violation of the ESD distance threshold (ESDth).

Conventional integrated circuit techniques fail to determine the final connection of a given antenna diode. Therefore, it is typically unknown as to whether an antenna diode placed at a lower-level of hierarchy (e.g., the RLM) will ultimately be connected to an externally located ESD noise source (e.g., a ground solder bump located at the chip level), which in turn will cause an ESD fail region buried inside the RLM level. One known solution currently used to avoid creating ESD fail regions is to use conservative component layout schemes that ensure each antenna diode within a given level of hierarchy satisfies the ESD distance threshold. However, such a conservative design scheme can cause density penalties and limits the overall size at which to design a given level of hierarchy. As a result, reduction in the overall size of the final chip design is limited.

Various non-limiting embodiments of the present invention solve the problem of inadvertently establishing ESD fail regions when designing integrated circuits by providing a system and method to perform correct-by-construction operations included in an integrated circuit design scheme capable of reducing or avoiding electrostatic discharge (ESD) events caused by cross-hierarchy tie nets. The system and method facilitate the exchange of component layout information between a first layer of hierarchy and a targeted lower-layer of hierarchy that includes the placement of antenna diodes having different polarities.

According to one or more non-limiting embodiments, the correct-by-construction operations include communicating chip power supply pin (sometimes referred to as a controlled collapse chip connection pin or simply a "C4 pin") connectivity to lower levels of hierarchy, while simultaneously communicating antenna diode connectivity from lower levels of hierarchy, and performing a ESD fail region mitigation operation that reduces or can even completely avoid establishing an ESD fail region. In some embodiments, the ESD fail region mitigation operation includes placing an ESD buffer component between the input antenna diode and the ESD noise source (e.g., the ground chip bump). In this manner, the input antenna diode is decoupled or "buffered" from the ESD noise source instead of being directly connected to the ESD noise source.

Figure 3:
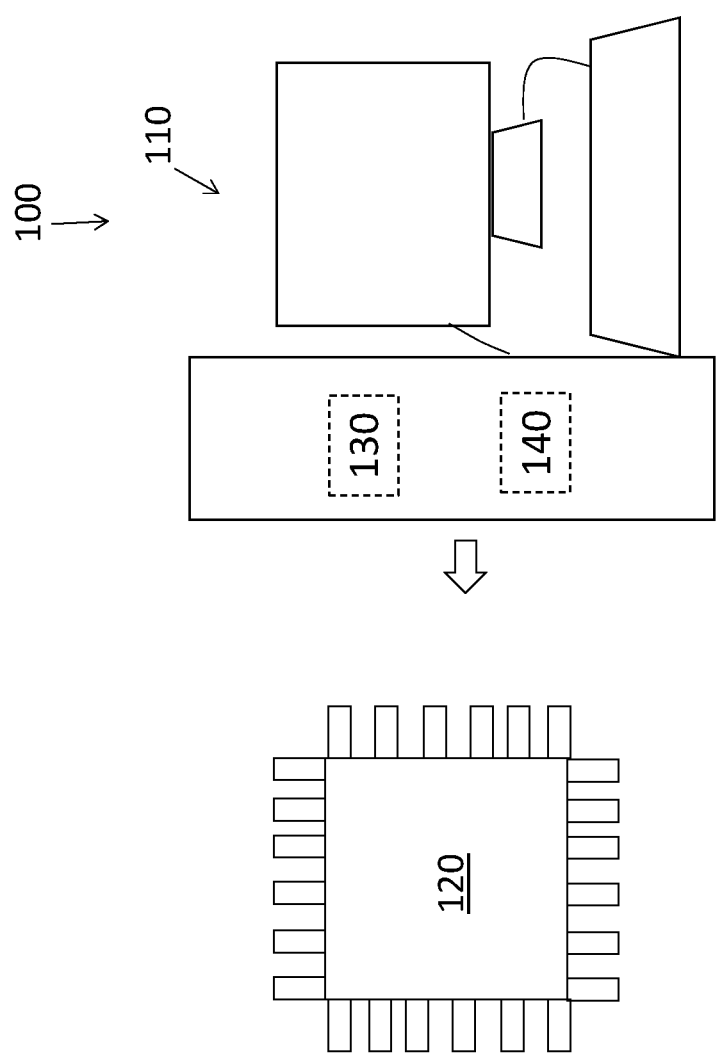
FIG. 3 is a block diagram of a system to perform correct-by-construction operations included in an integrated circuit design scheme that avoids electrostatic discharge (ESD) events caused by cross-hierarchy tie nets according to one or more embodiments of the invention.

FIG. 3 is a block diagram of a system 100 to perform correct-by-construction operations included in an integrated circuit design scheme that avoids electrostatic discharge (ESD) events caused by cross-hierarchy tie nets according to embodiments of the invention. The system 100 includes processing circuitry 110 used to generate the design that is ultimately fabricated into an integrated circuit 120.

The processing circuitry includes one or more processors 130 and memory 140 storing one or more software programs and code (collectively referred to as software). The software can include, but is not limited to, computer readable program instructions for carrying out operations of the present invention, assembler instructions, instruction-set-architecture (ISA) instructions, traffic generator and simulator programs, workload traces, cache layout information, instruction and data addresses, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The memory 140 can also store computer readable program instructions, which may execute entirely on the user's computer, partly on the user's computer, as a stand-alone software package, partly on the user's computer and partly on a remote computer or entirely on the remote computer or server The memory can also include software that establishes an IC simulator capable of defining, capturing, and/or manipulating design specifications of an IC in a hardware description language (HDL), such as VHDL (very high speed integrated circuit hardware description language, IEEE standard 1076) or Verilog® (IEEE standard 1364; "Verilog" is a registered trade mark of Cadence Design Systems, Inc.). The resulting HDL description typically characterizes the IC at a level of abstraction, such as a register transfer level (RTL), or a behavioral level.

A compiler is used to transform the HDL description into a "compiled model" of the IC. A simulator is then used to verify proper functional operation of the compiled model according to the design specification. Once the compiled model has been functionally verified, a synthesizer is used to map the compiled model to technology-specific logic gate structures, producing a logic level "netlist." Following further functional verification and/or timing verification, suitable positions of the logic gate structures of the netlist relative to one another are determined.

According to one or more non-limiting embodiments, the system 100 is capable of performing various correct-by-construction operations included in an integrated circuit design scheme that avoids electrostatic discharge (ESD) events caused by cross-hierarchy tie nets. For example, the memory 140 can store a hierarchy information data information data, e.g., a "parent shapeinfo file" and a "child shapeinfo file". The parent shapeinfo file stores connectivity information from higher levels of hierarchy (e.g., a chip level) to lower-level pins/nets. The child shapeinfo file stores connectivity information indicating antenna diode connectivity to higher-level pins/nets (e.g., connections between antenna diodes and macro boundary pins). Accordingly, the system 100 can facilitate the exchange of connectivity information between a first layer of hierarchy (e.g., the chip level) and a targeted lower-layer of hierarchy (e.g., the RLM) that includes the placement of antenna diodes having different polarities. Based on the exchanged information, the system 100 allows for performing a ESD fail region mitigation operation that reduces or can even completely avoid establishing an ESD fail region. Accordingly, correct-by-construction operations allow for providing an IC design that can ensure avoidance of ESD fail regions in a targeted level of hierarchy without undergoing multiple trial-and-error iterations.

The steps involved in the fabrication of the integrated circuit 120 are well-known and briefly described herein. Once the physical layout is finalized, based, in part, on correct-by-construction operations that avoid electrostatic discharge (ESD) events caused by cross-hierarchy tie nets according to embodiments of the invention to facilitate optimization of the routing plan, the finalized physical layout is provided to a foundry. Masks are generated for each layer of the integrated circuit based on the finalized physical layout. Then, the wafer is processed in the sequence of the mask order. The processing includes photolithography and etch. This is further discussed with reference to FIG. 8.

Figure 4:
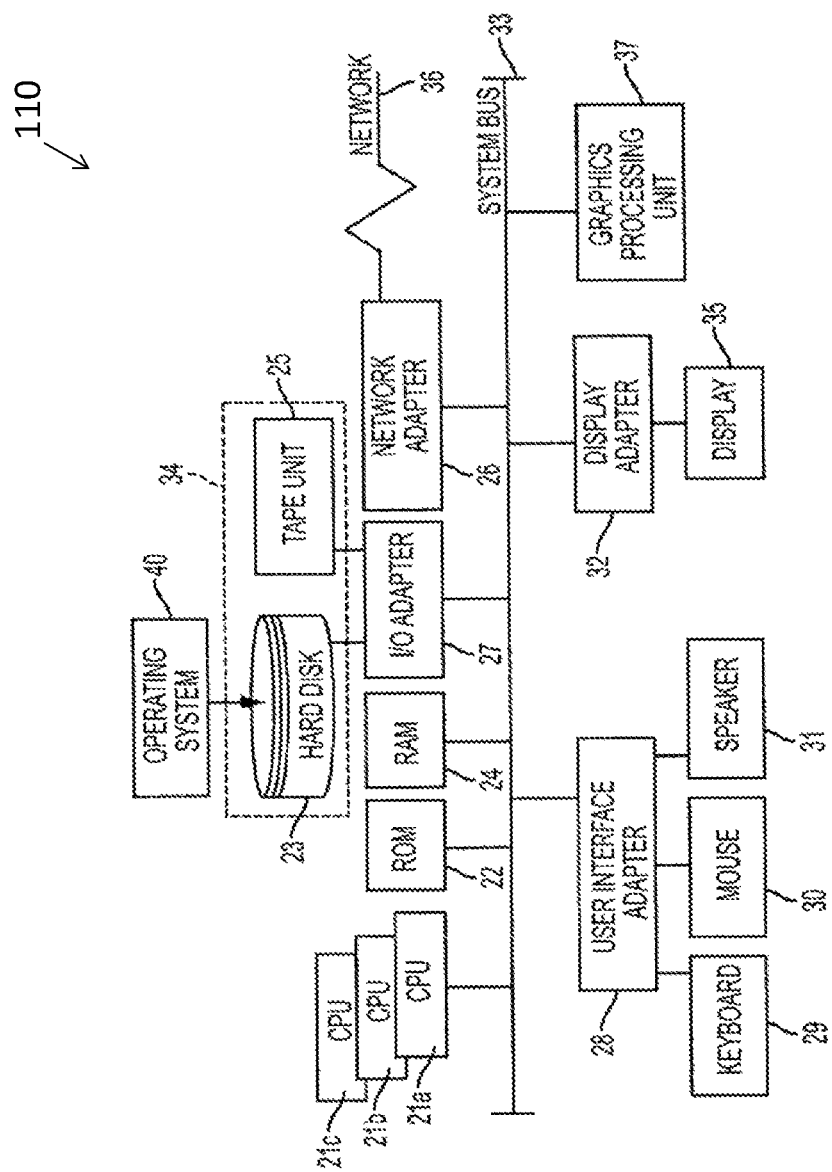
FIG. 4 is a block diagram of a processing system to generate the design that is fabricated into the integrated circuit according to one or more embodiments of the invention.

FIG. 4 is a block diagram of a processing system 110 used to generate the design that is fabricated into the integrated circuit 120. The processing system 110 has one or more central processing units (processors) 21a, 21b, 21c, etc.

(collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 110.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 110 can be stored in mass storage 34. The RAM 22, ROM 24, and mass storage 34 are examples of memory 19 of the processing system 110. A network adapter 26 interconnects system bus 33 with an outside network 36 enabling the processing system 110 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 110 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 110 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in the processing system 110.

Figure 5:
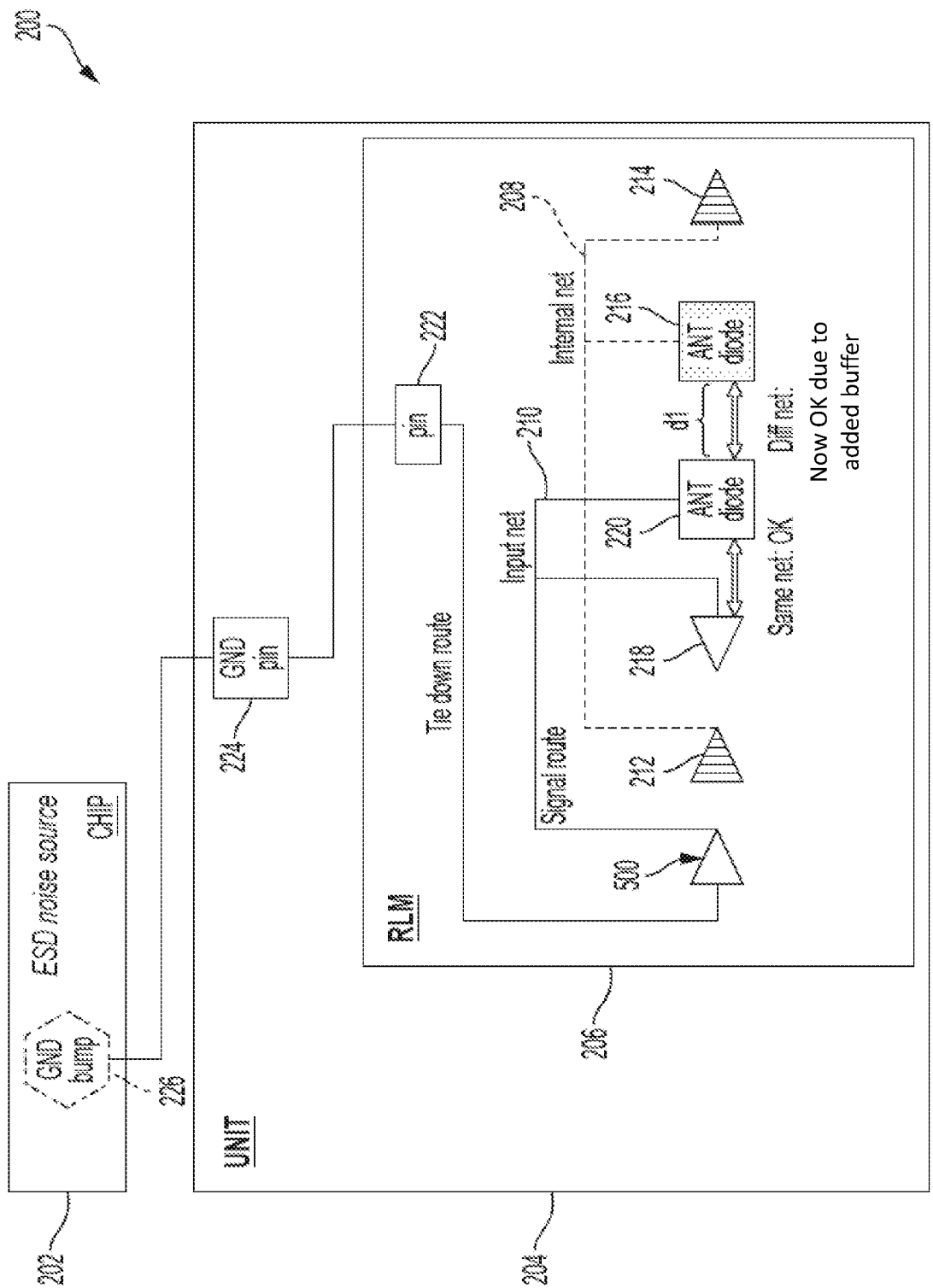
FIG. 5 illustrates an ESD fail region mitigation operation included in correct-by-construction operations to avoid an ESD event in the child macro shown in FIG. 2 according to a non-limiting embodiment of the invention.

Referring to FIG. 5 along with previously described FIG. 4, an ESD fail region mitigation operation included in correct-by-construction operations performed to avoid an ESD event in a targeted level of hierarchy is illustrated according to a non-limiting embodiment of the invention. According to the non-limiting embodiment illustrated in FIGS. 3-5, the RLM 206 is the targeted level of hierarchy because it includes the identified ESD fail region 228. It should be appreciated, however, that other levels or hierarchy may be identified as a target level on which the ESD fail region mitigation operation is to be performed.

As described herein, the ESD fail region mitigation operation is included in a plurality of correct-by-construction operations performed by the system 100 to avoid ESD events caused by cross-hierarchy tie nets. The ESD fail region mitigation operation is facilitated by the system's 100 additional correct-by-construction operations, which include communicating chip power supply pin (also referred to as "C4 pin") connectivity to lower levels of hierarchy, while simultaneously communicating antenna diode connectivity from lower levels of hierarchy (e.g., the targeted RLM). Following the exchange of information, additional correct-by-construction operations performed by the system 100 include various logic operations and constraint analyses that determine the type of ESD fail region mitigation operation to perform. The constraint analyses can include, but are not limited to, (1) determining a congestion of the target level of hierarchy; (2) determining whether the entire targeted level of hierarchy usage is "tied off"; (3) avoid forcing child block to space away antenna diodes, as that has largest "design effort" expense; (4) determining if all instances of a given block are "tied off" to the same chip connection, and adding a buffer at the lowest level of hierarchy possible, to limit the raw number of fixes needed from multiple re-use; and (5) determining the current stage of design and whether the antenna diode locations can be modified or whether the locations of the antenna diodes are "locked", e.g., the antenna diode locations and corresponding diode masks have been sent out for fabrication. In terms of adding the buffer, the system 100 is capable of receiving a logic functionality that defines the entire hierarchy and analyzing the constraints to establish the buffer in a specific level of hierarchy according to the connectivity of each placed instance of the targeted hierarchical level such that the logic functionality of the entire hierarchy is correctly maintained with minimal designer effort.

With continued reference to FIG. 5, the system 100 utilizes the logic to determine that the target level of hierarchy (e.g., the RLM 206) is not congested (e.g., the component density contained in the target level of hierarchy is below a density threshold) and the entire targeted level of hierarchy usage is not "tied off". Accordingly, a first ESD fail region mitigation operation is performed, which includes placing an ESD buffer circuit 500 (simply referred to herein as a "buffer") between the input antenna buffer 220 and the chip ground bump 226 providing the ESD noise source. For example, the ESD buffer 500 can have a first node connected to the input antenna diode 220 and an opposing node connected to a first end of the RLM pin 222. The opposing end of the RLM pin 222 is effectively connected to the chip ground bump 226. In this manner, the ESD buffer 500 decouples the input antenna diode 220 from the chip ground bump 226. In other words, the input antenna diode 220 is no longer directly connected to the ESD noise source provided by chip ground bump 226 thereby avoiding the establishment of an ESD fail region between the input antenna diode 220 and the internal antenna diode 216. In one or more non-limiting embodiments, the ESD buffer 500 is an inverter which effectively changes the polarity at the output of the buffer 500.

Figure 6:
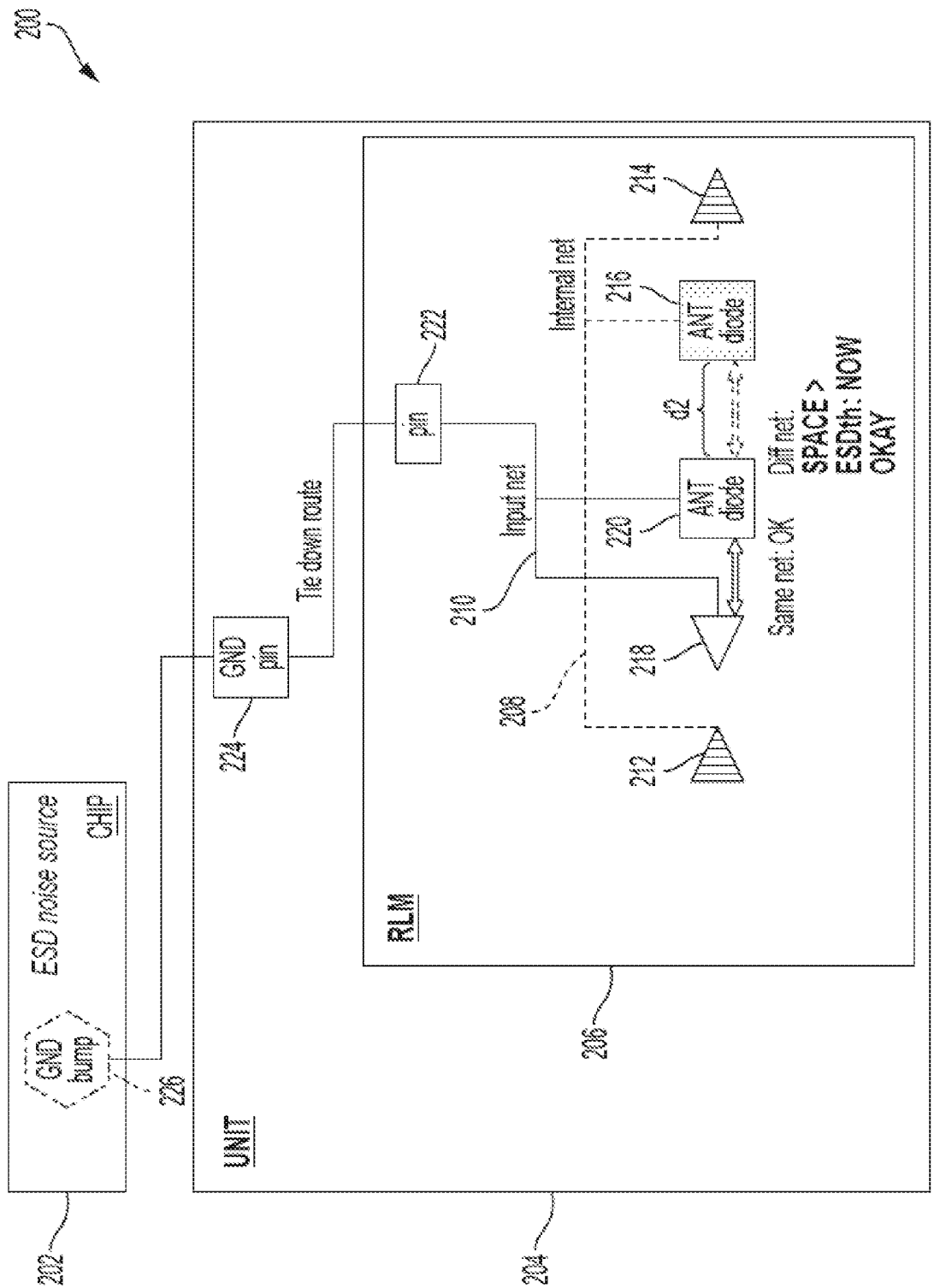
FIG. 6 illustrates an ESD fail region mitigation operation included in correct-by-construction operations to avoid an ESD event in the child macro shown in FIG. 2 according to a non-limiting embodiment of the invention.

Turning now to FIG. 6, an ESD fail region mitigation operation included in correct-by-construction operations performed to avoid an ESD event in a targeted level of hierarchy is illustrated according to another non-limiting embodiment of the invention. In this example, the logic operations executed by the system 100 may determine that the target level of hierarchy (e.g., the RLM 206) is congested (e.g., the component density contained in the target level of hierarchy exceeds a density threshold). In this case, the system 100 utilizes the logic to determine that placement of an ESD buffer is unavailable. Accordingly, instead of placing an ESD buffer the ESD fail region mitigation operation includes increasing the distance (d2) between the input antenna diode 220 and the internal antenna diode 216. Accordingly, the increased distance (d2) no longer violates the ESD threshold (ESDth) of the ESD distance rule thereby avoiding the establishment of an ESD fail region between the input antenna diode 220 and the internal antenna diode 216.

Figure 7:
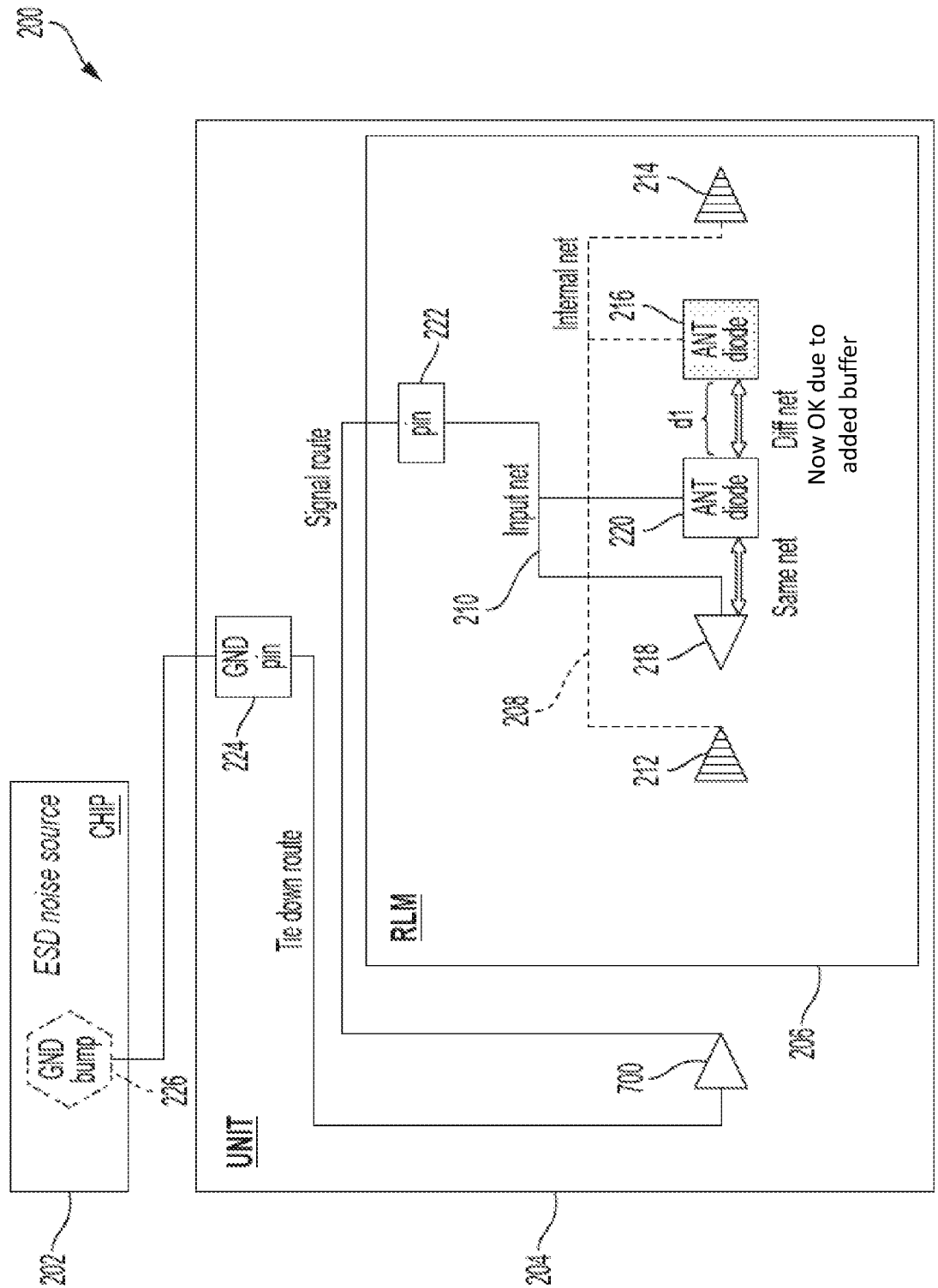
FIG. 7 illustrates an ESD fail region mitigation operation included in correct-by-construction operations to avoid an ESD event in the child macro shown in FIG. 2 according to a non-limiting embodiment of the invention.

With reference to FIG. 7, an ESD fail region mitigation operation included in correct-by-construction operations performed to avoid an ESD event in a targeted level of hierarchy is illustrated according to yet another non-limiting embodiment of the invention. In this scenario, the logic utilized by the system 100 determines that the masks for fabricating the antenna diodes included in the target level of hierarchy (e.g., the RLM 206) have been sent for fabrication such that their locations and distances between one another can no longer be modified to avoid creating an ESD region. Therefore, the ESD fail region mitigation operation utilized in FIG. 7 is to place an ESD buffer 700 (for example, utilizing a spare buffer cell at the unit level of hierarchy) in the unit level 204. The ESD buffer 700 includes a first node that is connected to the RLM pin 222 and a second node connected to the unit ground pin 224. In this manner, the ESD buffer 700 buffer decouples the input antenna diode 220 from the chip ground bump 226. In other words, the input antenna diode 220 is no longer directly connected to the ESD noise source provided by chip ground bump 226 thereby avoiding the establishment of an ESD fail region between the input antenna diode 220 and the internal antenna diode 216. In one or more non-limiting embodiments, the ESD buffer 700 is an inverter which effectively changes the polarity at the output of the buffer 700.

Figure 8:
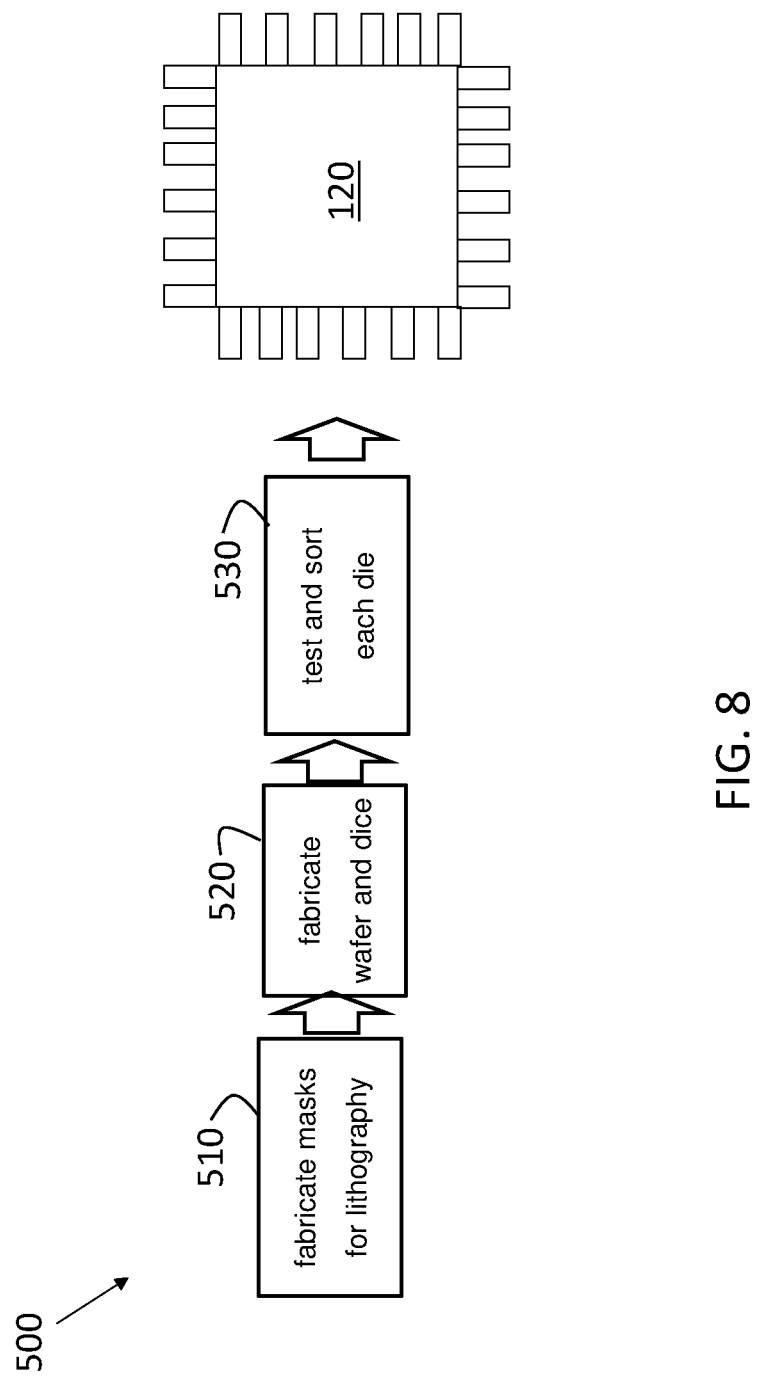
FIG. 8 is a process flow of a method of fabricating the integrated circuit according to exemplary embodiments of the invention.

Turning to FIG. 8, a process flow for fabricating the integrated circuit 120 is illustrated according to a non-limiting embodiment of the invention. Once the physical design data is obtained, based, in part, on the correct-by-construction operations that avoid electrostatic discharge (ESD) events caused by cross-hierarchy tie nets described herein, the integrated circuit 120 can be fabricated according to known processes that are generally described with reference to FIG. 8. Generally, a wafer with multiple copies of the final design is fabricated and cut (i.e., diced) such that each die is one copy of the integrated circuit 120. At block 510, the processes include fabricating masks for lithography (e.g., transistor masks, diode masks, and metallization masks) based on the finalized physical layout. In one or more non-limiting embodiments, masks of the transistors and diodes (e.g., antenna diodes) may be sent out at an earlier design phase than the metallization masks associated with the metal connections (e.g., connections for forming a buffer). As a result, the ESD fail region mitigation operation of adding a buffer at a higher level of hierarchy described herein may be the operation selected to avoid establishing an ESD region because the masks for the antenna diodes included in a given level of hierarchy have already been sent out for fabrication. At block 520, fabricating the wafer includes using the masks to perform photolithography and etching. Once the wafer is diced, testing and sorting each die is performed, at block 530, to filter out any faulty die before providing the fabricated integrated circuit 120.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system configured to avoid establishing an electrostatic discharge (ESD) region in an integrated circuit (IC), the system comprising:
 a processor; and
 memory storing an IC simulator, the processor configured to control the IC simulator to perform operations comprising:
  establishing an IC chip that is sub-divided into a plurality of hierarchical levels;
  analyzing a first hierarchical level among the plurality of hierarchical levels to determine first connectivity information indicating connectivity between the first hierarchical level and one or both of lower-level pins and lower-level nets of a targeted hierarchical level having a lower-level of hierarchy with respect to the first hierarchical level, the targeted hierarchical level including a first antenna diode connected to a first net having a first polarity and a second antenna diode having a second polarity opposite the first diode;
  analyzing the targeted hierarchical level to determine second connectivity information indicating diode connectivity to one or both high-level pins and higher-level nets included in the first hierarchical level; and
  determining a first distance between the first antenna diode and the second diode and comparing the first distance to an ESD distance threshold; and
  determining an ESD fail region mitigation operation configured to avoid establishing the ESD region based on the first connectivity information and the second connectivity information in response to the first distance exceeding the ESD distance threshold.

2. The system of claim 1, wherein the second connectivity information indicates a connection between the second antenna diode and an ESD noise source included in the first hierarchical level.

3. The system of claim 2, wherein the ESD fail region mitigation operation includes increasing the first distance to a second distance that exceeds the ESD distance threshold.

4. The system of claim 2, wherein the ESD fail region mitigation operation includes establishing an ESD buffer between the second antenna diode and the ESD noise source.

5. The system of claim 4, wherein the ESD buffer is established in the targeted hierarchical level.

6. The system of claim 4, wherein the ESD buffer is established in a hierarchical level included in the plurality of hierarchical level that has a higher level of hierarchy with respect to the targeted hierarchical level.

7. The system of claim 4, further comprising receiving a logic functionality of defining all the plurality of hierarchical levels hierarchy,
 wherein the ESD buffer is established in a second targeted level of hierarchy among the plurality of hierarchical levels of hierarchy based on the connectivity of each placed instance of the targeted hierarchical level such that the logic functionality of the entire hierarchy is maintained.

8. A computer implemented method to avoid establishing an electrostatic discharge (ESD) region in an integrated circuit (IC), the method comprising:
 establishing, via an IC simulator, an IC chip that is sub-divided into a plurality of hierarchical levels;
 analyzing, via the IC simulator, a first hierarchical level among the plurality of hierarchical levels to determine first connectivity information indicating connectivity between the first hierarchical level and one or both of lower-level pins and lower-level nets of a targeted hierarchical level having a lower-level of hierarchy with respect to the first hierarchical level, the targeted hierarchical level including a first antenna diode connected to a first net having a first polarity and a second antenna diode having a second polarity opposite the first diode;
 analyzing, via the IC simulator, the targeted hierarchical level to determine second connectivity information indicating diode connectivity to one or both high-level pins and higher-level nets included in the first hierarchical level; and
 determining a first distance between the first antenna diode and the second diode and comparing the first distance to an ESD distance threshold; and determining, via the IC simulator, an ESD fail region mitigation operation configured to avoid establishing the ESD region based on the first connectivity information and the second connectivity information in response to the first distance exceeding the ESD distance threshold.

9. The method of claim 8, wherein the second connectivity information indicates a connection between the second antenna diode and an ESD noise source included in the first hierarchical level.

10. The method of claim 9, wherein the ESD fail region mitigation operation includes increasing the first distance to a second distance that exceeds an ESD distance threshold.

11. The method of claim 9, wherein the ESD fail region mitigation operation includes establishing an ESD buffer between the second antenna diode and the ESD noise source.

12. The method of claim 11, wherein the ESD buffer is established in the targeted hierarchical level.

13. The method of claim 11, wherein the ESD buffer is established in a hierarchical level included in the plurality of hierarchical level that has a higher level of hierarchy with respect to the targeted hierarchical level.

14. The method of claim 11, further comprising:
receiving a logic functionality of defining all the plurality of hierarchical levels hierarchy; and
establishing the ESD buffer in a second targeted level of hierarchy among the plurality of hierarchical levels hierarchy based on the connectivity of each placed instance of the targeted hierarchical level such that the logic functionality of the entire hierarchy is maintained.

15. A computer program product comprising a computer readable storage medium having program instructions embodied therewith, the program instructions executable by a processor to cause the processor to control an integrated circuit (IC) simulator to perform operations comprising:
establish an IC chip that is sub-divided into a plurality of hierarchical levels;
analyze a first hierarchical level among the plurality of hierarchical levels to determine first connectivity information indicating connectivity between the first hierarchical level and one or both of lower-level pins and lower-level nets of a targeted hierarchical level having a lower-level of hierarchy with respect to the first hierarchical level, the targeted hierarchical level including a first antenna diode connected to a first net having a first polarity and a second antenna diode having a second polarity opposite the first diode;
analyze the targeted hierarchical level to determine second connectivity information indicating diode connectivity to one or both high-level pins and higher-level nets included in the first hierarchical level; and
determining a first distance between the first antenna diode and the second diode and comparing the first distance to an ESD distance threshold; and
determine an ESD fail region mitigation operation configured to avoid establishing the ESD region based on the first connectivity information and the second connectivity information in response to the first distance exceeding the ESD distance threshold.

16. The computer program product of claim 15, wherein the second connectivity information indicates a connection between the second antenna diode and an ESD noise source included in the first hierarchical level.

17. The computer program product of claim 16, wherein the ESD fail region mitigation operation includes increasing the first distance to a second distance that exceeds an ESD distance threshold.

18. The computer program product of claim 16, wherein the ESD fail region mitigation operation includes establishing an ESD buffer between the second antenna diode and the ESD noise source.

* * * * *